US012761983B2

(12) United States Patent
Owada

(10) Patent No.: US 12,761,983 B2
(45) Date of Patent: Oct. 13, 2026

(54) DATA PROCESSING APPARATUS, COMPUTER-READABLE STORAGE MEDIUM, SYSTEM, AND DATA PROCESSING METHOD FOR IMPROVED EVENT PROCESSING

(71) Applicant: SoftBank Corp., Tokyo (JP)

(72) Inventor: Minoru Owada, Saitama (JP)

(73) Assignee: SoftBank Corp., Tokyo (JP)

( * ) Notice: Subject to any disclaimer, the term of this patent is extended or adjusted under 35 U.S.C. 154(b) by 681 days.

(21) Appl. No.: 18/167,099

(22) Filed: Feb. 10, 2023

(65) Prior Publication Data

US 2023/0195545 A1 Jun. 22, 2023

Related U.S. Application Data

(63) Continuation of application No. PCT/JP2021/005768, filed on Feb. 16, 2021.

(30) Foreign Application Priority Data

Nov. 18, 2020 (JP) ................................ 2020-192098

(51) Int. Cl.
*G06F 9/54* (2006.01)
*G06F 9/48* (2006.01)

(52) U.S. Cl.
CPC ................ *G06F 9/542* (2013.01); *G06F 9/48* (2013.01)

(58) Field of Classification Search
CPC .................................. G06F 9/542; G06F 9/48
See application file for complete search history.

(56) References Cited

U.S. PATENT DOCUMENTS 11,080,065 B1 * 8/2021 Reshadi ................ H04L 67/564
2011/0093304 A1 * 4/2011 Nielsen ................ G06Q 10/087 701/31.4

(Continued)

FOREIGN PATENT DOCUMENTS

JP 2008293404 A 12/2008
JP 2019023791 A 2/2019

OTHER PUBLICATIONS

International Search Report and (ISA/237) Written Opinion of the International Search Authority for International Patent Application No. PCT/JP2021/005768, mailed by the Japan Patent Office on May 18, 2021.

*Primary Examiner* — Pierre Vital
*Assistant Examiner* — Tuan M Nguyen

(57) ABSTRACT

There is provided a data processing apparatus including: a set data recording unit configured to record set data obtained by combining an event representing data which is generated by processing data by a program, with a program which is started when a plurality of events including the event are complete and processes the plurality of events; and a data processing execution unit configured to execute a plurality of programs by a plurality of pieces of set data recorded by the set data recording unit. There is provided a data processing method including: recording set data obtained by combining an event representing data which is generated by processing data by a program, with a program which is started when a plurality of events including the event are complete and processes the plurality of events; and executing a plurality of programs by a plurality of pieces of set data recorded.

15 Claims, 9 Drawing Sheets

(56) References Cited

U.S. PATENT DOCUMENTS

2011/0126201 A1* 5/2011 Iyer .......................... G06F 9/542
718/102
2014/0156683 A1* 6/2014 de Castro Alves ..........................
G06F 16/24568
707/774
2015/0120739 A1* 4/2015 Hosokawa ............ G06F 16/285
707/740
2016/0050261 A1* 2/2016 Mcdaid ................. H04L 45/302
709/204
2016/0358101 A1* 12/2016 Bowers ................... G06F 9/453
2016/0364650 A1 12/2016 Fletcher
2017/0083386 A1* 3/2017 Wing ..................... G06Q 10/10
2017/0177263 A1* 6/2017 Das ....................... G06F 13/382
2018/0074786 A1* 3/2018 Oberbreckling .... G06F 16/2255
2019/0377817 A1* 12/2019 McCluskey ........... G06F 16/258
2020/0257555 A1* 8/2020 Underwood .......... G06F 9/3877
2020/0364196 A1* 11/2020 Frost ..................... G06F 16/258

* cited by examiner

70

| DATA/PROGRAM | CONTENT |
|---|---|
| NAME OF DATA | EVENT E_A |
| start() | If (E_B EXISTS) call (C); |

FIG.3

71

| DATA/PROGRAM | CONTENT |
|---|---|
| NAME OF DATA | EVENT E_B |
| start() | If (E_A EXISTS) call (C); |

FIG.4

DATA PROCESSING APPARATUS, COMPUTER-READABLE STORAGE MEDIUM, SYSTEM, AND DATA PROCESSING METHOD FOR IMPROVED EVENT PROCESSING

The contents of the following Japanese patent application(s) are incorporated herein by reference:

NO. 2020-192098 filed in JP on Nov. 18, 2020

NO. PCT/JP2021/005768 filed in WO on Feb. 16, 2021

BACKGROUND

1. Technical Field

The present invention relates to a data processing apparatus, a program, a system, and a data processing method.

2. Related Art

Patent Document 1 discloses CEP (Complex Event Processing) as a technique for performing stream processing.

PRIOR ART DOCUMENT

Patent Document

Patent Document 1: Japanese Patent Application Publication No. 2019-023791

The summary clause does not necessarily describe all necessary features of the embodiments of the present invention. The present invention may also be a sub-combination of the features described above.

BRIEF DESCRIPTION OF THE DRAWINGS

FIG. 3 schematically shows an example of set data 70.

FIG. 4 schematically shows an example of set data 71.

DESCRIPTION OF EXEMPLARY EMBODIMENTS

CEP and batch processing are known as techniques for processing of determining whether a plurality of events satisfy a certain group of conditions. In the batch processing, a time range that can be handled is very long, but a real time performance is very low. In the CEP, the real time performance is very high, but the time range that can be handled is very narrow. The data processing apparatus 100 according to the present embodiment realizes complex event processing in which the real time performance is lower than the CEP in the related art, but is higher than the batch processing, and the time range that can be handled is as long as the batch processing.

Hereinafter, the invention will be described through embodiments of the invention, but the following embodiments do not limit the invention according to claims. In addition, not all of the combinations of features described in the embodiments are essential to the solving means of the invention.

Figure 1:
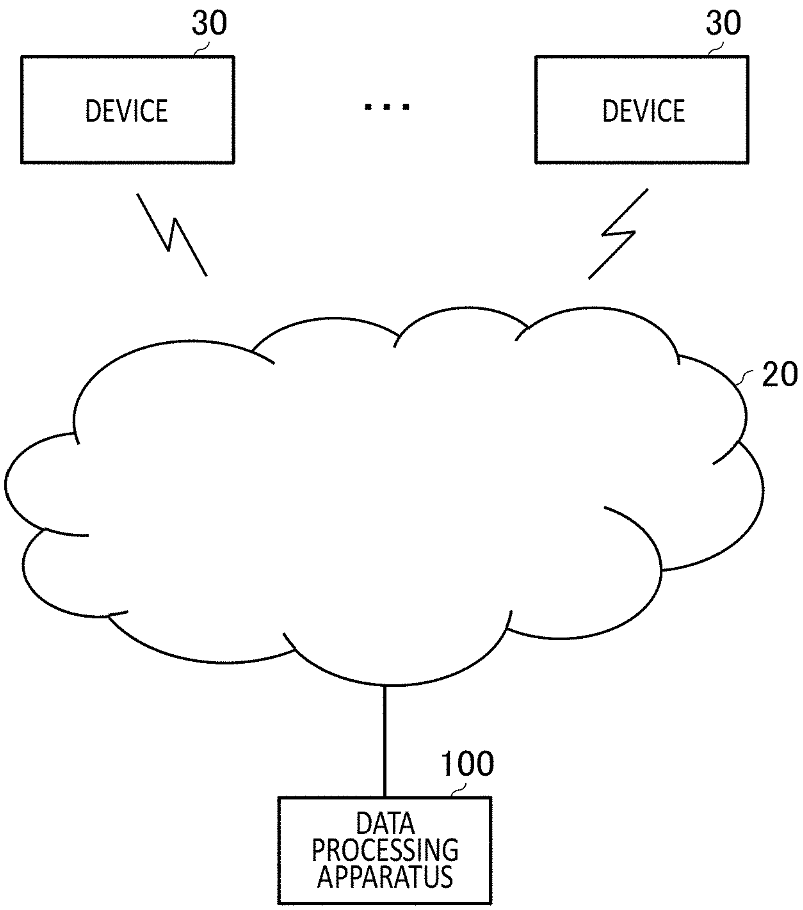
FIG. 1 schematically shows an example of a communication environment of a data processing apparatus 100.

FIG. 1 schematically shows an example of a communication environment of a data processing apparatus 100. The data processing apparatus 100 executes the complex event processing on a plurality of pieces of data.

The data processing apparatus 100 may receive data which is a processing target, from a device 30. The data processing apparatus 100 may receive the data from the device 30, via a network 20. The data processing apparatus 100 may receive the data from each of a plurality of devices 30. The data processing apparatus 100 may receive the plurality of pieces of data from one device 30.

The network 20 may include, for example, a mobile communication network. The network 20 may conform to a 5G (5th Generation) communication system. The network 20 may conform to an LTE (Long Term Evolution) communication system. The network 20 may conform to a 3G (3rd Generation) communication system. The network 20 may conform to a 6G (6th Generation) communication system and the communication system of the subsequent generation.

The data processing apparatus 100 may function as MEC (Mobile Edge Computing). The device 30 may be any device capable of communicating with the mobile communication network. The device 30 may also be a so-called IoT (Internet of Things) device. The device 30 may be a smart phone, a tablet terminal, a wearable terminal, and the like.

The network 20 may include the Internet. The network 20 may include a LAN (Local Area Network). The network 20 may include any other network. The device 30 may be wirelessly connected to the network 20, or may be connected in a wired manner.

Figure 2:
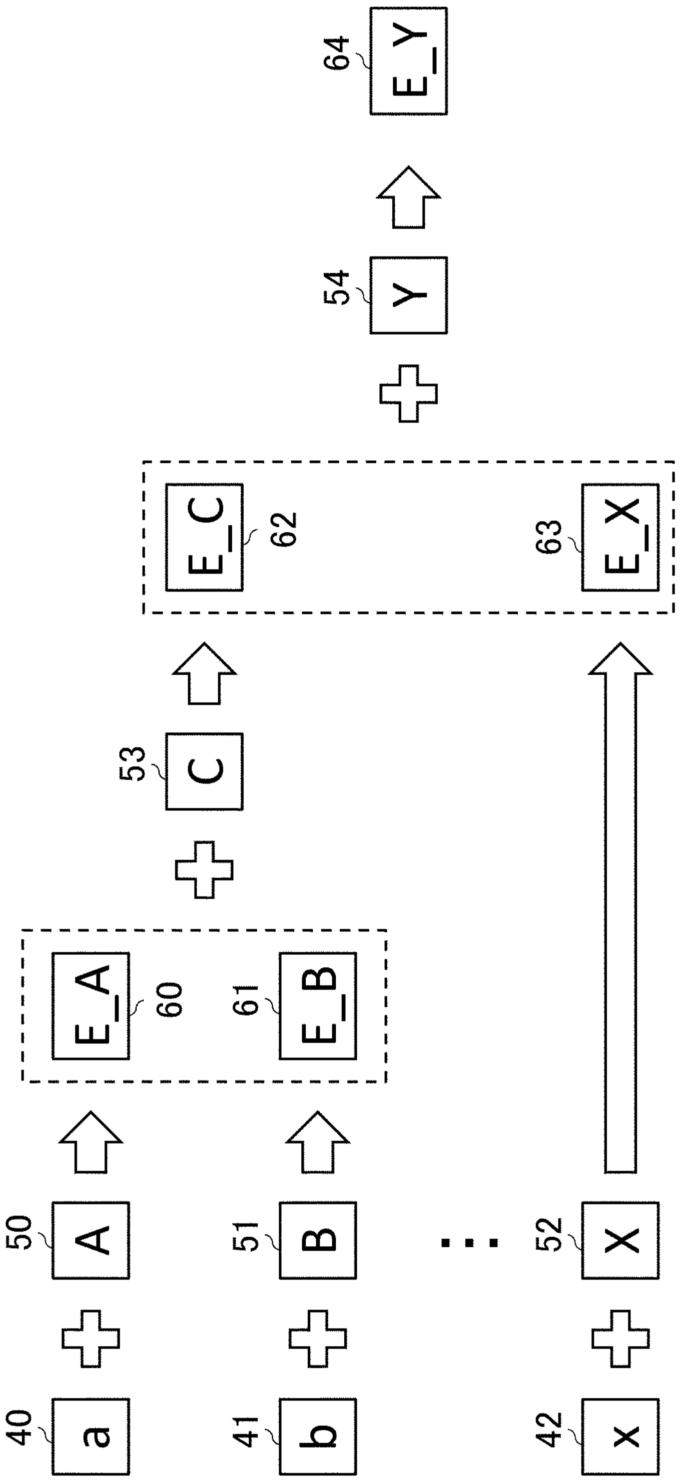
FIG. 2 is an illustration for describing complex event processing.

FIG. 2 is an illustration for describing complex event processing. As described above, in the existing CEP, the time range that can be handled is very narrow. Reasons why the CEP cannot handle complicate conditions over a long period of time includes a fact that in order to evaluate a plurality of events at a high speed, all the events should be stored on a memory, and a fact that data and a program are separated from each other, and thus a large number of programs cannot be loaded.

When both of the data and the program are on the memory, a computer can perform the processing. The batch processing is a method of arranging the plurality of pieces of data on the memory and continuously applying one piece of data to one program. In online processing of the Web or the like, one piece of data is applied to a large number of programs. In contrast to those, the CEP is a system in which a large number of programs and a large number of pieces of data are arranged on the memory to be applied to each other. In the CEP, the data is processed by the program for the event to be detected, which is also accumulated as the data on the memory.

For example, in a case where a generation time of data a40 and a generation time of data b41 are close to each other, both of an event EA60 and an event EB61 can simultaneously exist on the memory, and the processing can be performed by a program C53 to detect an event EC62. However, the data may not be complete to be conveniently used.

In a case where the generation times of the data a40 and the data b41 are separated, it is not possible for both of the event EA60 and the event EB61 to exist in the memory, and the program C53 cannot be operated. An amount of the memory is finite, and thus in a case of handling a longer period of time, a range of a target that can be processed is limited to be narrow.

In actual complex event processing, a large amount of data are processed simultaneously in parallel. However, it is possible to process only an amount by which storing is performed in the memory. For example, in a case of lengthening the period of time of the target, it is possible to handle only a small number of events. In a case of increasing the number of events, the period of time becomes short. In a case of increasing the period of time and the number of events, both become small. In a case of complicating the processing, both of the period of time and the number of events become small.

In contrast to that, the data processing apparatus 100 according to the present embodiment saves an event and a program which are paired as a set, for mutual connections. For example, when recording the event EA60, a program A50 records the event EB61 which is one of the pair, together with a fact that a program which is started when the pair is complete, is the program C53. In addition, when recording the event EB61, a program B51 records the event EA60 which is the pair, together with a fact that a program which is started when the pair is complete, is the program C53.

In the present embodiment, the recording of the data and the program as a set may thus be referred to as forming a tuple of the data and the program. In addition, tuple data may be described as set data.

FIG. 3 schematically shows an example of set data 70. FIG. 3 illustrates the set data 70 obtained by combining the event EA60 which is generated by processing the data a40 by the program A50, with the program C53 which is started when the event EA60 and the event EB61 are complete and which processes the event EA60 and the event EB61.

FIG. 4 schematically shows an example of set data 71. FIG. 4 illustrates the set data 71 obtained by combining the event EB61 which is generated by processing the data b41 by the program B51, with the program C53 which is started when the event EA60 and the event EB61 are complete and which processes the event EA60 and the event EB61.

For example, when the data a40 is first received, the data processing apparatus 100 processes the data a40 by the program A50. In this manner, the event EA60 is recorded. Subsequently, the data processing apparatus 100 executes a start ( ) recorded in combination with the event EA60. At this time, the event EB61 does not yet exist, and thus the program C53 is not called.

Then, when the data b41 is received, the data processing apparatus 100 processes the data b41 by the program B51. In this manner, the event EB61 is recorded. Subsequently, the data processing apparatus 100 executes a start ( ) recorded in combination with the event EB61. At this time, the event EA60 already exists, and thus the program C53 is called. By the data processing apparatus 100 recording the set data 70 and the set data 71, any of the generation of the event EA60 and the generation of the event EB61 may be first, and the generations may be separated in time.

In the related art, the data and the programs are managed separately. Therefore, both of the event EA60 and the event EB61 are required to be in the memory when the program which processes the event EA60 and the event EB61, is operated. Alternatively, there is no choice but to abandon the real time performance and perform the batch processing.

In contrast to that, with the data processing apparatus 100 according to the present embodiment, it is possible to be able to execute the complex event processing, by recording tuple set data, without depending on order of the generations or time intervals of the events. In addition, it is possible to reduce a required amount of memory. For example, when receiving the data a40, the data processing apparatus 100 arranges the data a40 and the program A50 in the memory to generate the event EA60 by the data a40 being processed by the program A50. Then, the event EA60 is stored in a storage medium such as a hard disk or an SSD (Solid State Disk), and the data a40 and the program A50 are deleted from the memory.

Then, when receiving the data b41, the data processing apparatus 100 arranges the data b41 and the program B51 in the memory to generate the event EB61 by the data b41 being processed by the program B51. Then, the data b41 and the program B51 are deleted from the memory, the event EA60 and the program C53 are arranged in the memory, and the event EA60 and the event EB61 are processed by the program C53.

In this way, it is possible to make the memory for the event EB61 be unnecessary when the event EA60 is processed, and it is possible to make the memory for the event EA60 be unnecessary when the event EB61 is processed, which makes it possible to realize the complex event processing over a longer period of time than that of the CEP in the related art.

Figure 5:
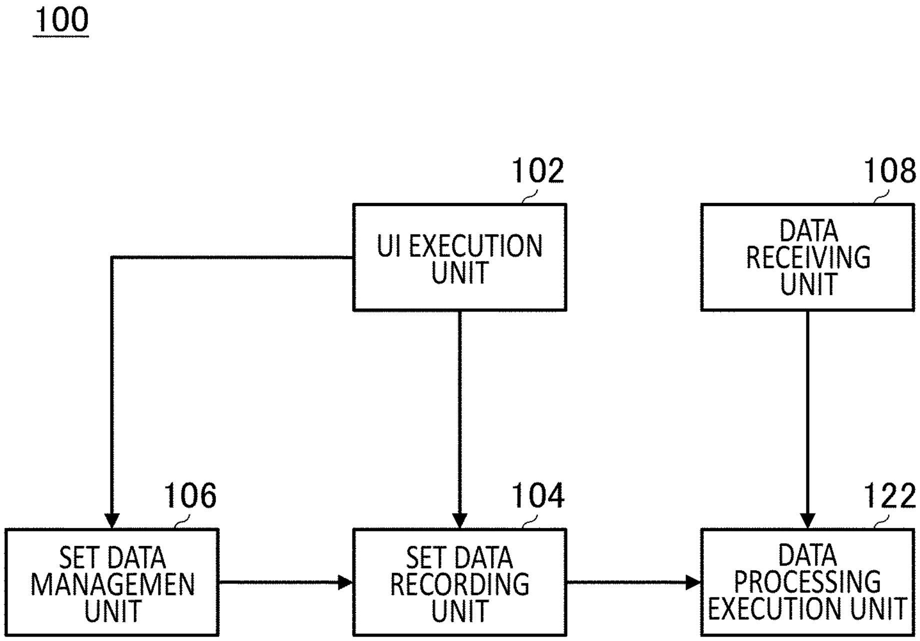
FIG. 5 schematically shows an example of a functional configuration of the data processing apparatus 100.

FIG. 5 schematically shows an example of a functional configuration of the data processing apparatus 100. The data processing apparatus 100 includes a UI execution unit 102, a set data recording unit 104, a set data management unit 106, a data receiving unit 108, and a data processing execution unit 122.

The UI (User Interface) execution unit 102 executes a UI for programming. The UI execution unit 102 may display the UI on a display unit of the data processing apparatus 100, or may display the UI on a communication apparatus that is used by a user who performs the programming. The user may register the set data via a UI which is provided by the UI execution unit 102. As described above, the set data may be data obtained by combining an event representing data which is generated by processing data by a program, with a program which is started when a plurality of events including the event are complete and processes the plurality of events.

The set data recording unit 104 records the set data registered via the UI which is provided by the UI execution unit 102. The set data recording unit 104 may record the set data for each of the plurality of events.

For example, the set data recording unit 104 is configured to record first set data obtained by combining a first event with a first program which is started when the first event and a second event are complete and which processes the first event and the second event. In addition, the set data recording unit 104 is configured to record second set data obtained by combining the second event with the first program which is started when the second event and the first event are complete and which processes the second event and the first event. In this way, by recording the set data obtained by combining the first program with each of the first event and the second event that are the conditions for starting the first program, it is possible to be able to normally proceed the processing whichever event occurs first.

The set data management unit 106 is configured to manage a plurality of pieces of set data, by a graph database in which each of the plurality of pieces of set data is set as a node. The set data management unit 106 may use any graph database in which links between nodes can be handled.

In an actual data processing scene, the configuration is not as simple as that illustrated in FIG. 2, but is very complicated, and the plurality of events and a plurality of programs are combined in a complicated manner. In contrast to that, by using the graph database, it is possible to enhance a management efficiency, and it is possible to support the programming by the user.

The data receiving unit 108 receives the data which is the processing target. The data receiving unit 108 receives the data from one or more devices 30 via the network 20.

The data processing execution unit 122 is configured to execute a plurality of programs, by the plurality of pieces of set data recorded in the set data recording unit 104, on the data which is set as the target and which is received by the data receiving unit 108. The data processing execution unit 122 causes, for example, the display unit of the data processing apparatus 100 to display a processing result. In addition, the data processing execution unit 122 may transmit the processing result to another apparatus.

Figure 6:
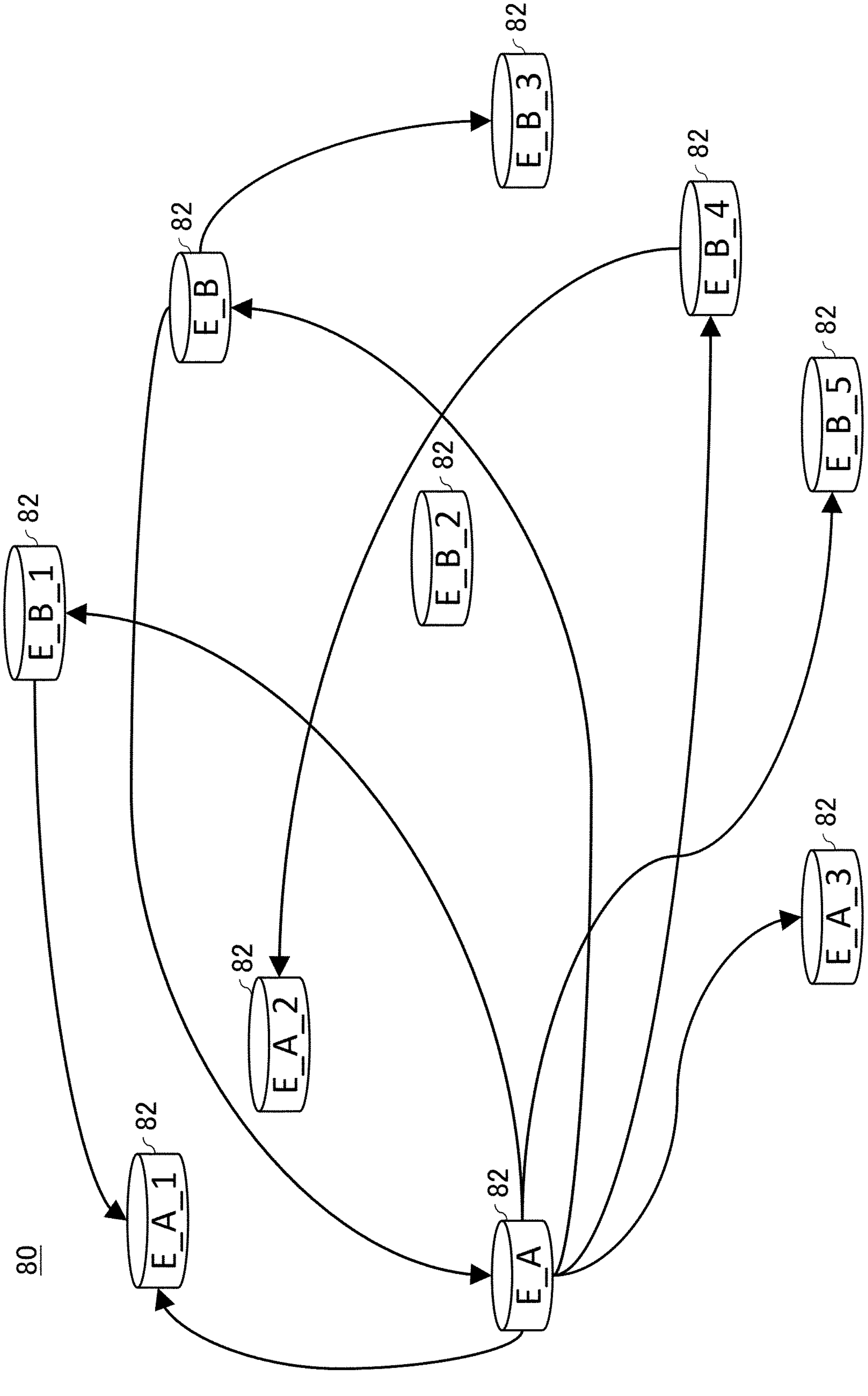
FIG. 6 schematically shows an example of a graph database 80.

FIG. 6 schematically shows an example of a graph database 80. The set data management unit 106 sets a plurality of pieces of set data 82 as nodes, and manages the plurality of pieces of set data 82 by the graph database 80. The set data management unit 106 may provide the user with the UI as shown in FIG. 6. The user may perform the programming by operating the set data 82 and arrows between the nodes, by a pointing device or the like.

Figure 7:
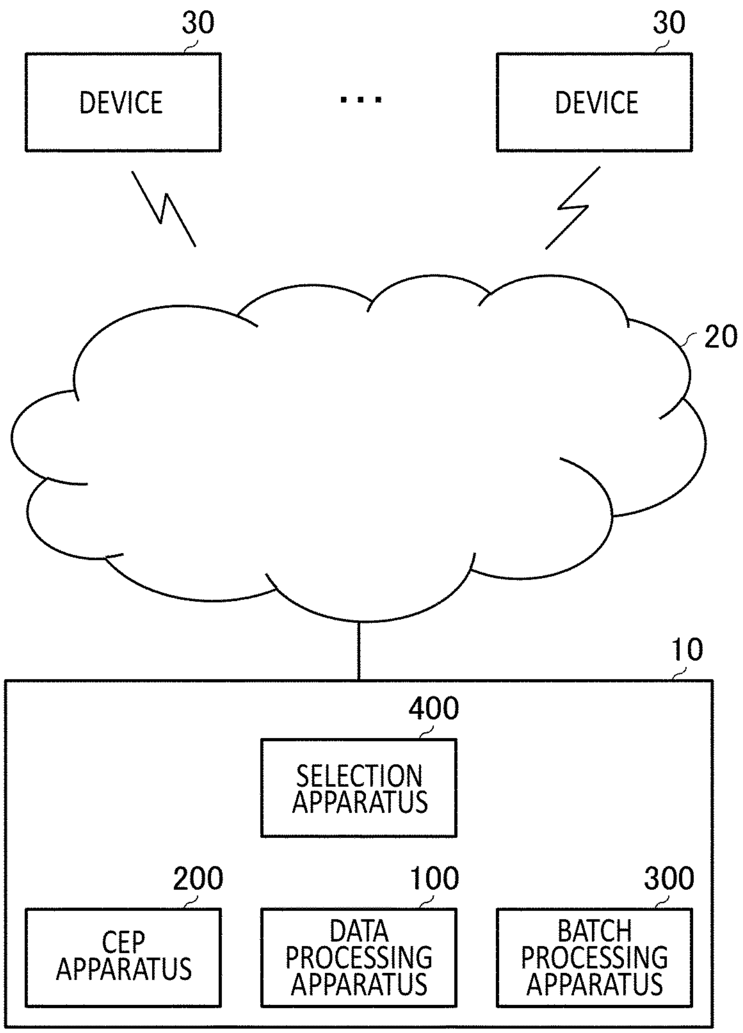
FIG. 7 schematically shows an example of a system 10.

FIG. 7 schematically shows an example of a system 10. The system 10 includes the data processing apparatus 100. The system 10 may include a CEP apparatus 200. The system 10 may include a batch processing apparatus 300. The system 10 may include a selection apparatus 400.

The CEP apparatus 200 is able to execute the CEP on the data. The CEP apparatus 200 may receive the data which is the processing target from the device 30. The CEP apparatus 200 may receive the data from the device 30, via the network 20. The CEP apparatus 200 may receive the data from each of the plurality of devices 30. The CEP apparatus 200 may receive the plurality of pieces of data from one device 30.

The batch processing apparatus 300 is able to execute the batch processing on the data. The batch processing apparatus 300 may receive the data which is the processing target, from the device 30. The batch processing apparatus 300 may receive the data from the device 30, via the network 20. The batch processing apparatus 300 may receive the data from each of the plurality of devices 30. The batch processing apparatus 300 may receive the plurality of pieces of data from one device 30.

The selection apparatus 400 is configured to select an apparatus that processes the data from the data processing apparatus 100, the CEP apparatus 200, and the batch processing apparatus 300. The selection apparatus 400 may select, according to a predetermined condition, the apparatus that processes the data from the data processing apparatus 100, the CEP apparatus 200, and the batch processing apparatus 300. The selection apparatus 400 may be an example of a selection unit.

For example, the selection apparatus 400 is configured to select, according to an amount of the data which is the processing target, the apparatus that processes the data from the data processing apparatus 100, the CEP apparatus 200, and the batch processing apparatus 300. For example, the selection apparatus 400 is configured to select the CEP apparatus 200 when the amount of the data which is the processing target is smaller than a first threshold value. In addition, for example, the selection apparatus 400 selects the batch processing apparatus 300 when the amount of the data which is the processing target is greater than a second threshold value which is greater than the first threshold value. In addition, for example, the selection apparatus 400 selects the data processing apparatus 100 when the amount of the data which is the processing target is greater than the first threshold value and is smaller than the second threshold value.

In addition, for example, the selection apparatus 400 is configured to select, according to a response performance of processing which is a target, the apparatus that processes the data from the data processing apparatus 100, the CEP apparatus 200, and the batch processing apparatus 300. For example, the selection apparatus 400 selects the CEP apparatus 200 when the response performance which is required is faster than a first threshold value. In addition, for example, the selection apparatus 400 selects the batch processing apparatus 300 when the response performance which is required is slower than a second threshold value which is slower than the first threshold value. In addition, for example, the selection apparatus 400 selects the data processing apparatus 100 when the response performance which is required is slower than the second threshold value and is faster than the first threshold value.

The selection apparatus 400 may select, according to both of the amount of the data which is the processing target, and the response performance of the processing which is the target, the apparatus that processes the data from the data processing apparatus 100, the CEP apparatus 200, and the batch processing apparatus 300.

The system 10 makes it possible to realize the complex event processing at a high speed, a medium speed, and a low speed, and enables a flexible configuration in accordance with the response performance and the amount of the data.

It should be noted that the data processing apparatus 100 may have a function of the selection apparatus 400. In addition, the CEP apparatus 200 may have a function of the selection apparatus 400. In addition, the batch processing apparatus 300 may have a function of the selection apparatus 400. In these cases, the system 10 may not include the selection apparatus 400.

Figure 8:
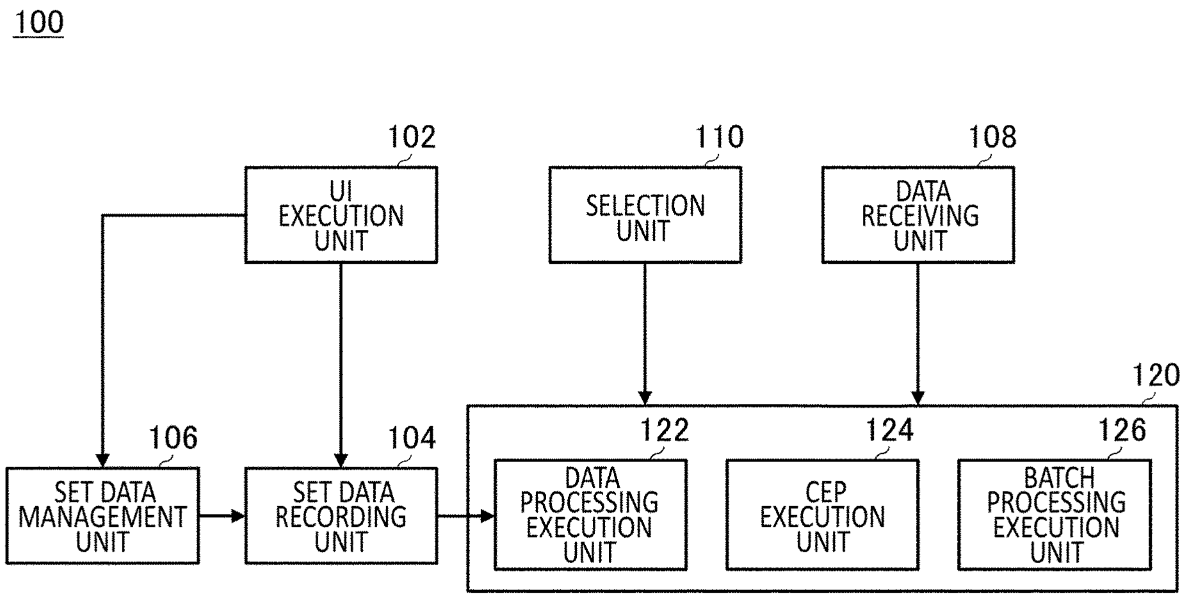
FIG. 8 schematically shows an example of the functional configuration of the data processing apparatus 100.

FIG. 8 schematically shows another example of the functional configuration of the data processing apparatus 100. Here, a point different from FIG. 5 will be mainly described. The data processing apparatus 100 includes the UI execution unit 102, the set data recording unit 104, the set data management unit 106, the data receiving unit 108, a selection unit 110, and an execution unit 120. The execution unit 120 includes the data processing execution unit 122, a CEP execution unit 124, and a batch processing execution unit 126. The selection unit 110 is configured to select, according to a predetermined condition, an execution unit that processes the data from the data processing execution unit 122, the CEP execution unit 124, and the batch processing execution unit 126.

For example, the selection unit 110 is configured to select, according to an amount of the data which is the processing target, the execution unit that processes the data from the data processing execution unit 122, the CEP execution unit 124, and the batch processing execution unit 126. For example, the selection unit 110 selects the CEP execution unit 124 when the amount of the data which is the processing target is smaller than a first threshold value. In addition, for example, the selection unit 110 selects the batch processing execution unit 126 when the amount of the data which is the processing target is greater than a second threshold value which is greater than the first threshold value. In addition, for example, the selection unit 110 selects the data processing execution unit 122 when the amount of the data which is the processing target is greater than the first threshold value and is smaller than the second threshold value.

In addition, for example, the selection unit 110 is configured to select, according to the response performance of the processing which is the target, the execution unit that processes the data from the data processing execution unit 122, the CEP execution unit 124, and the batch processing execution unit 126. For example, the selection unit 110 selects the CEP execution unit 124 when the response performance which is required is faster than a first threshold value. In addition, for example, the selection unit 110 selects the batch processing execution unit 126 when the response performance which is required is slower than a second threshold value which is slower than the first threshold value. In addition, for example, the selection unit 110 selects the data processing execution unit 122 when the response performance which is required is slower than the second threshold value and is faster than the first threshold value.

The selection unit 110 may select, according to both of the amount of the data which is the processing target and the response performance of the processing which is the target, the execution unit that processes the data from the data processing execution unit 122, the CEP execution unit 124, and the batch processing execution unit 126.

With the data processing apparatus 100 shown in FIG. 8, it is possible to execute the complex event processing at a medium speed, in addition to the complex event processing at a high speed and a low speed. This enables a flexible configuration in accordance with the response performance and the amount of the data. In addition, it is considered to be difficult to realize a so-called digital twin in the related art that has only the CEP in the related art which can handle only a short period of time, and the batch processing which can handle a long period of time but has no real time performance; however, with the data processing apparatus 100, it is possible to perform the event processing of a short period of time at a high speed, the event processing of a long period of time at a medium speed, and the batch processing for a statistical analysis, and thus it is possible to contribute to realizing the digital twin.

Figure 9:
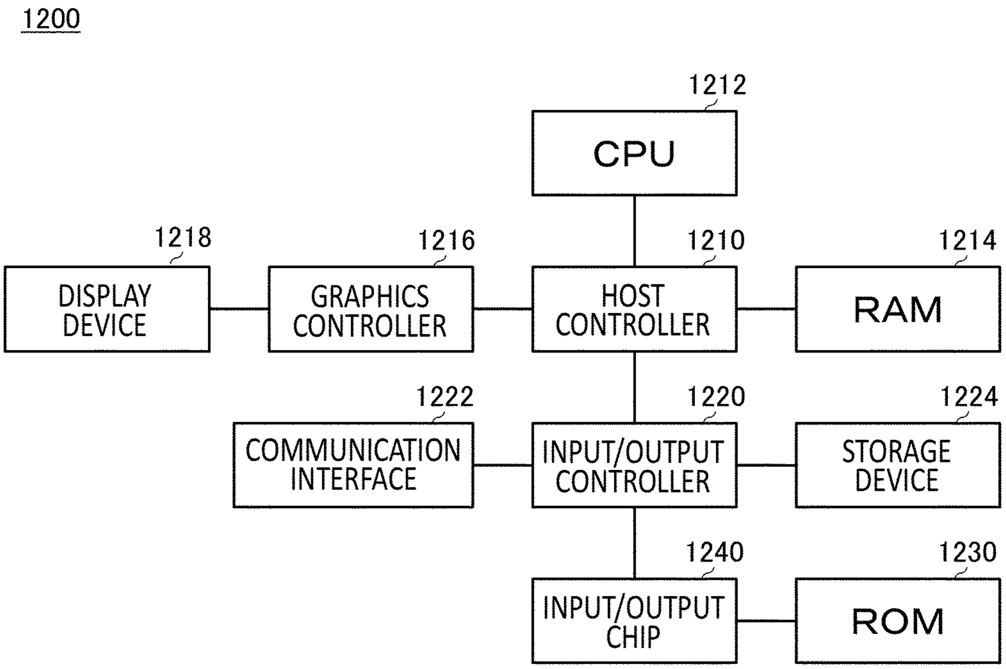
FIG. 9 schematically shows an example of a hardware configuration of a computer 1200 that functions as the data processing apparatus 100.

FIG. 9 schematically shows an example of a hardware configuration of a computer 1200 that functions as the data processing apparatus 100, the CEP apparatus 200, the batch processing apparatus 300, or the selection apparatus 400. A program installed in the computer 1200 can cause the computer 1200 to function as one or more "units" of an apparatus according to the present embodiment, or cause the computer 1200 to perform operations associated with the apparatus or perform one or more "units" thereof according to the present embodiment, and/or cause the computer 1200 to perform the process according to the present embodiment or perform the steps of the process. Such a program may be executed by a CPU 1212 to cause the computer 1200 to execute specific operations associated with some or all of the blocks in the flowcharts and block diagrams described in the present specification.

The computer 1200 according to the present embodiment includes the CPU 1212, a RAM 1214, and a graphics controller 1216, which are connected to each other via a host controller 1210. The computer 1200 also includes input/output units such as a communication interface 1222, a storage device 1224, a DVD drive, and an IC card drive, which are connected to the host controller 1210 via an input/output controller 1220. The DVD drive may be a DVD-ROM drive, a DVD-RAM drive, etc. The storage device 1224 may be a hard disk drive, a solid-state drive, and the like. The computer 1200 also includes a legacy input/output unit such as a ROM 1230 and a keyboard, which are connected to the input/output controller 1220 via an input/output chip 1240.

The CPU 1212 operates according to the programs stored in the ROM 1230 and the RAM 1214, thereby controlling each unit. The graphics controller 1216 acquires image data which is generated by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The DVD drive reads the programs or the data from the DVD-ROM or the like, and provides the storage device 1224 with the programs or the data. The IC card drive reads the programs and the data from an IC card and/or writes the programs and the data into the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like, to the input/output controller 1220.

A program is provided by a computer-readable storage medium such as the DVD-ROM or the IC card. The program is read from the computer-readable storage medium, installed into the storage device 1224, the RAM 1214, or the ROM 1230, which are also examples of the computer-readable storage medium, and executed by the CPU 1212. The information processing written in the programs is read by the computer 1200, resulting in cooperation between the programs and the above various types of hardware resources. An apparatus or a method may be constituted by implementing the operation or processing of information in accordance with the use of the computer 1200.

For example, in a case where a communication is performed between the computer 1200 and an external device, the CPU 1212 may execute a communication program loaded in the RAM 1214 and instruct the communication interface 1222 to perform communication processing based on processing written in the communication program. The communication interface 1222, under a control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write back the processed data to the external recording medium.

Various types of information such as various types of programs, data, tables, and databases may be stored in a recording medium and subjected to information processing. The CPU 1212 may perform various types of processing on the data read from the RAM 1214, to write a result back to the RAM 1214, the processing being described throughout the present disclosure and specified by instruction sequences of programs, and including various types of operations, information processing, condition judging, conditional branch, unconditional branch, retrievals/replacements of information, or the like. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying the predetermined condition.

The above described programs or software modules may be stored in the computer-readable storage medium on the computer 1200 or near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent steps of processes in which operations are performed or "units" of apparatuses responsible for performing operations. Certain steps and "units" may be implemented by dedicated circuitry, programmable circuitry supplied with computer-readable instructions stored on a computer-readable storage medium, and/or processors supplied with computer-readable instructions stored on a computer-readable storage medium. Dedicated circuitry may include digital and/or analog hardware circuits, and may include integrated circuits (IC) and/or discrete circuits. For example, programmable circuitry may include reconfigurable hardware circuits including logical AND, OR, XOR, NAND, NOR, and other logical operations, flip-flops, registers, and memory elements, such as field-programmable gate arrays (FPGA), programmable logic arrays (PLA), and the like.

A computer-readable storage medium may include any tangible device that can store instructions for execution by a suitable device, and as a result, the computer-readable storage medium having instructions stored therein includes an article of manufacture including instructions which can be executed to create means for executing operations specified in the flowchart or block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or other programmable data processing apparatuses, or to programmable circuitry, locally or via a local area network (LAN) or a wide area network (WAN) such as the Internet, so that the processor of the general purpose computer, the special purpose computer, or the other programmable data processing apparatuses, or the programmable circuitry executes the computer-readable instructions to create means for executing operations specified in the flowcharts or block diagrams. Examples of the processor include a computer processor, a processing unit, a microprocessor, a digital signal processor, a controller, a microcontroller, and the like.

While the present invention has been described with the embodiments, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: network; 30: device; 40: data a; 41: data b; 42: data x; 50: program A; 51: program B; 52: program X; 53: program C; 54: program Y; 60: event EA; 61: event EB; 62: Event EC; 63: Event EX; 64: Event EY; 70: set data; 71: set data; 80: graph database; 82: set data; 100: data processing apparatus; 102: UI execution unit; 104: set data recording unit; 106: set data management unit; 108: data receiving unit; 110: selection unit; 120: execution unit; 122: data processing execution unit; 124: CEP execution unit; 126: batch processing execution unit; 200: CEP apparatus; 300: batch processing apparatus; 400: selection apparatus; 1200: computer; 1210: host controller; 1212: CPU; 1214: RAM; 1216: graphics controller; 1218: display device; 1220: input/output controller; 1222: communication interface; 1224: storage device; 1230: ROM; 1240: input/output chip.

What is claimed is:

1. A data processing apparatus comprising:

one or more processors provided with computer-readable instructions such that, when the computer-readable instructions are executed by the one or more processors, the data processing apparatus is configured to comprise:

a data receiving unit configured to receive data;

a set data recording unit configured to record a plurality of set data, each of the plurality of set data being obtained by combining a corresponding one of a plurality of events with a corresponding one of a plurality of first programs, each of the plurality of set data also including identifying information regarding any others of the plurality of events associated with the corresponding one of the plurality of events, the corresponding one of the plurality of first programs being started when each of the corresponding one of the plurality of events and any others of the plurality of events associated with the corresponding one of the plurality of events have been generated by a respective one of a plurality of second programs by processing the data obtained by the data receiving unit, the corresponding one of the plurality of first programs processes the corresponding one of the plurality of events and any others of the plurality of events associated with the corresponding one of the plurality of events to generate a corresponding one of a plurality of resulting events; and a data processing execution unit configured to execute the plurality of first programs, each of the plurality of first programs being configured to process at least two respective events from among the plurality of events and the plurality of resulting events, wherein the data processing apparatus further comprises a memory, and wherein when one of the plurality of second programs processes the data obtained by the data receiving unit to generate one of the plurality of events, the one of the plurality of events generated by the one of the plurality of second programs is stored in a non-transitory storage medium and the data that has been processed and the one of the plurality of second programs are deleted from the memory to reduce a required amount of memory, and wherein each of the plurality of first programs is capable of processing corresponding ones of the plurality of events and the plurality of resulting events regardless of the order in which the corresponding ones of the plurality of events and the plurality of resulting events are generated and regardless of the time interval between the generation of each of the corresponding ones of the plurality of events and the plurality of resulting events.

2. The data processing apparatus according to claim 1, wherein the set data recording unit is configured to record a first set data, of the plurality of set data, obtained by combining a first event, of the plurality of events, with a first one of the plurality of first programs, which is started when the first event and a second event, of the plurality of events, have been generated and which processes the first event and the second event, and a second set data, of the plurality of set data, obtained by combining the second event with the first one of the plurality of first programs, which is started when the second event and the first event have been generated and which processes the second event and the first event.

3. The data processing apparatus according to claim 1, comprising:

a set data management unit configured to manage the plurality of set data, by a graph database in which each of the plurality of set data is set as a node.

4. The data processing apparatus according to claim 2, comprising:

a set data management unit configured to manage the plurality of set data, by a graph database in which each of the plurality of set data is set as a node.

5. The data processing apparatus according to claim 1, comprising:

a CEP (Complex Event Processing) execution unit configured to execute CEP on the data;

a batch processing execution unit configured to execute batch processing on the data; and a selection unit configured to select, according to a predetermined condition, an execution unit that processes data output from the data processing execution unit, the CEP execution unit, and the batch processing execution unit.

6. The data processing apparatus according to claim 2, comprising:

a CEP (Complex Event Processing) execution unit configured to execute CEP on the data;

a batch processing execution unit configured to execute batch processing on the data; and a selection unit configured to select, according to a predetermined condition, an execution unit that processes data output from the data processing execution unit, the CEP execution unit, and the batch processing execution unit.

7. The data processing apparatus according to claim 3, comprising:

a CEP (Complex Event Processing) execution unit configured to execute CEP on the data;

a batch processing execution unit configured to execute batch processing on the data; and a selection unit configured to select, according to a predetermined condition, an execution unit that processes data output from the data processing execution unit, the CEP execution unit, and the batch processing execution unit.

8. The data processing apparatus according to claim 4, comprising:

a CEP (Complex Event Processing) execution unit configured to execute CEP on the data;

a batch processing execution unit configured to execute batch processing on the data; and a selection unit configured to select, according to a predetermined condition, an execution unit that processes data output from the data processing execution unit, the CEP execution unit, and the batch processing execution unit.

9. The data processing apparatus according to claim 5, wherein the selection unit is configured to select, according to an amount of the data which is a processing target, the execution unit that processes the data output from the data processing execution unit, the CEP execution unit, and the batch processing execution unit.

10. The data processing apparatus according to claim 5, wherein the selection unit is configured to select, according to a response performance of processing which is a target, the execution unit that processes the data output from the data processing execution unit, the CEP execution unit, and the batch processing execution unit.

11. A non-transitory, computer-readable storage medium having stored thereon a program that causes a computer to function as:

a data receiving unit configured to receive data;

a set data recording unit configured to record a plurality of set data, each of the plurality of set data being obtained by combining a corresponding one of a plurality of events with a corresponding one of a plurality of first programs, each of the plurality of set data also including identifying information regarding any others of the plurality of events associated with the corresponding one of the plurality of events, the corresponding one of the plurality of first programs being started when each of the corresponding one of the plurality of events and any others of the plurality of events associated with the corresponding one of the plurality of events have been generated by a respective one of a plurality of second programs by processing the data obtained by the data receiving unit, the corresponding one of the plurality of first programs processes the corresponding one of the plurality of events and any others of the plurality of events associated with the corresponding one of the plurality of events to generate a corresponding one of a plurality of resulting events; and a data processing execution unit configured to execute the plurality of first programs, each of the plurality of first programs being configured to process at least two respective events from among the plurality of events and the plurality of resulting events, wherein the computer further comprises a memory, and wherein when one of the plurality of second programs processes the data obtained by the data receiving unit to generate one of the plurality of events, the one of the plurality of events generated by the one of the plurality of second programs is stored in a non-transitory storage medium and the data that has been processed and the one of the plurality of second programs are deleted from the memory to reduce a required amount of memory, and wherein the program causes the computer to function such that each of the plurality of first programs is capable of processing corresponding ones of the plurality of events and the plurality of resulting events regardless of the order in which the corresponding ones of the plurality of events and the plurality of resulting events are generated and regardless of the time interval between the generation of each of the corresponding ones of the plurality of events and the plurality of resulting events.

12. A system comprising:

the data processing apparatus according to claim 1;

a CEP (Complex Event Processing) apparatus that is able to execute CEP on the data;

a batch processing apparatus that is able to execute batch processing on the data; and a selection unit configured to select, according to a predetermined condition, an apparatus that processes output data from the data processing apparatus, the CEP apparatus, and the batch processing apparatus.

13. A system comprising:

the data processing apparatus according to claim 2;

a CEP (Complex Event Processing) apparatus that is able to execute CEP on the data;

a batch processing apparatus that is able to execute batch processing on the data; and a selection unit configured to select, according to a predetermined condition, an apparatus that processes output data from the data processing apparatus, the CEP apparatus, and the batch processing apparatus.

14. A system comprising:

the data processing apparatus according to claim 3;

a CEP (Complex Event Processing) apparatus that is able to execute CEP on the data;

a batch processing apparatus that is able to execute batch processing on the data; and a selection unit configured to select, according to a predetermined condition, an apparatus that processes output data from the data processing apparatus, the CEP apparatus, and the batch processing apparatus.

15. A data processing method that is executed by a computer, wherein the computer executes instructions that cause the computer to comprise a set data recording unit and a data receiving unit, the data processing method comprising:

recording, in the set data recording unit, a plurality of set data, each of the plurality of set data being obtained by combining a corresponding one of a plurality of events with a corresponding one of a plurality of first programs, each of the plurality of set data also including identifying information regarding any others of the plurality of events associated with the corresponding one of the plurality of events, the corresponding one of the plurality of first programs being started when each of the corresponding one of the plurality of events and any others of the plurality of events associated with the corresponding one of the plurality of events have been generated by a respective one of a plurality of second programs by processing the data obtained by the data receiving unit, the corresponding one of the plurality of first programs processes the corresponding one of the plurality of events and any others of the plurality of events associated with the corresponding one of the plurality of events to generate a corresponding one of a plurality of resulting events; and executing the plurality of first programs, each of the plurality of first programs being configured to process at least two respective events from among the plurality of events and the plurality of resulting events, wherein the computer further comprises a memory, and wherein when one of the plurality of second programs processes the data obtained by the data receiving unit to generate one of the plurality of events, the one of the plurality of events generated by the one of the plurality of second programs is stored in a non-transitory storage medium and the data that has been processed and the one of the plurality of second programs are deleted from the memory to reduce a required amount of memory, and wherein each of the plurality of first programs is capable of processing corresponding ones of the plurality of events and the plurality of resulting events regardless of the order in which the corresponding ones of the plurality of events and the plurality of resulting events are generated and regardless of the time interval between the generation of each of the corresponding ones of the plurality of events and the plurality of resulting events.

* * * * *